United States Patent
Bernal-Lara et al.

(10) Patent No.: US 12,043,012 B2
(45) Date of Patent: Jul. 23, 2024

(54) FILM FOR BAG IN BOX PACKAGE AND BAG MADE THEREFROM

(71) Applicant: Scholle IPN Corporation, Northlake, IL (US)

(72) Inventors: Teresa Bernal-Lara, Lincolnshire, IL (US); David Bellmore, DeWitt, MI (US)

(73) Assignee: Scholle IPN Corporation, Northlake, IL (US)

( * ) Notice: Subject to any disclaimer, the term of this patent is extended or adjusted under 35 U.S.C. 154(b) by 0 days.

(21) Appl. No.: 16/431,089

(22) Filed: Jun. 4, 2019

(65) Prior Publication Data

US 2019/0367219 A1  Dec. 5, 2019

Related U.S. Application Data

(60) Provisional application No. 62/680,096, filed on Jun. 4, 2018.

(51) Int. Cl.
*B32B 27/08* (2006.01)
*B65D 30/08* (2006.01)
(Continued)

(52) U.S. Cl.
CPC .............. *B32B 27/08* (2013.01); *B65D 31/02* (2013.01); *B32B 27/306* (2013.01);
(Continued)

(58) Field of Classification Search
CPC ...... B65D 33/02; B65D 31/02; B65D 77/065; B65D 75/5877; B32B 27/08; B32B 27/306; B32B 2250/24; B32B 2307/7244; B32B 2439/46; B32B 1/00; B32B 27/32; B32B 2250/246; B32B 2307/518; B32B 2307/558; B32B 2307/732;
(Continued)

(56) References Cited

U.S. PATENT DOCUMENTS

| | | | | |
|---|---|---|---|---|
| 6,383,583 B1 * | 5/2002 | Ninomiya | ............... | B32B 27/08 428/35.4 |
| 2007/0217719 A1 * | 9/2007 | Smith | .................. | B65D 77/062 383/66 |
| 2010/0151218 A1 * | 6/2010 | Curie | ...................... | B32B 27/32 428/220 |

OTHER PUBLICATIONS

Maddah, Hisham A., "Polypropylene as a Promising Plastic: A Review", American Journal of Polymer Science, 2016, vol. 6(1): pp. 1-11.

(Continued)

*Primary Examiner* — James C Yager
(74) *Attorney, Agent, or Firm* — The Watson IP Group, PLC; Jovan N. Jovanovic

(57) ABSTRACT

A bag having a front panel and a back panel coupled together through a plurality of seals, defining a cavity structurally configured to retain a flowable material. The panels are formed from a film that has a first film portion and a second film portion laminated together at an interface. The first film portion has an inner surface and an outer surface and includes an oriented polyethylene. The second film portion is a coextrusion having an inner surface and an outer surface. The extrusion has a core, with a first overlying layer on one side of the core and a second overlying layer on a second side of the core opposite the one side. The core includes EVOH. The first overlying layer and the second overlying layer include polyethylene.

11 Claims, 2 Drawing Sheets

(51) Int. Cl.
*B32B 27/30* (2006.01)
*B65D 33/02* (2006.01)
*B65D 77/06* (2006.01)

(52) U.S. Cl.
CPC ... *B32B 2250/24* (2013.01); *B32B 2307/7244* (2013.01); *B32B 2439/46* (2013.01); *B65D 33/02* (2013.01); *B65D 77/065* (2013.01); *Y10T 428/1334* (2015.01); *Y10T 428/1352* (2015.01); *Y10T 428/1379* (2015.01); *Y10T 428/1383* (2015.01)

(58) Field of Classification Search
CPC . B32B 2307/746; B32B 2439/70; B32B 7/12; Y10T 428/1379; Y10T 428/1383; Y10T 428/1352; Y10T 428/1334
See application file for complete search history.

(56) References Cited

OTHER PUBLICATIONS

The Association of Plastic Recyclers, PE Film Design Guidance, https://plasticsrecycling.org/pe-film-design-guidance, Jul. 2, 2021.
Ragaert, Kim, Delva, Laurens and Van Geem, Kevin M., "Mechanical and Chemical Recycling of Solid Plastic Waste", Waste Management, Aug. 2017, 69, pp. 24-58.

* cited by examiner

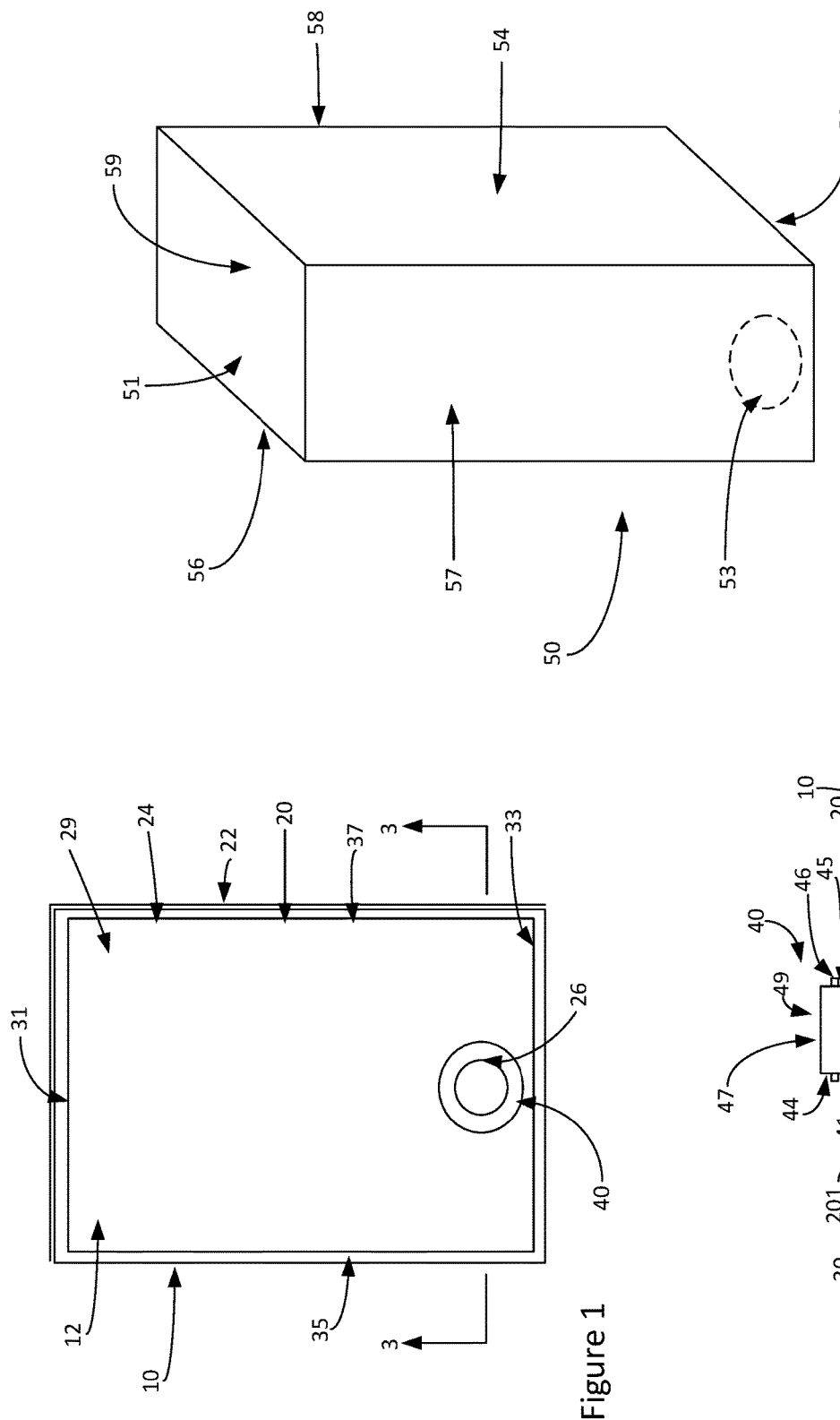

FILM FOR BAG IN BOX PACKAGE AND BAG MADE THEREFROM

CROSS-REFERENCE TO RELATED APPLICATION

This application claims priority from U.S. Pat. App. Ser. No. 62/680,096 filed Jun. 4, 2018, entitled "Film for Bag In Box Packaging And Bag Made Therefrom", the entire disclosure of which is hereby incorporated by reference in its entirety.

BACKGROUND OF THE DISCLOSURE

1. Field of the Disclosure

The disclosure relates in general to polymer films that are suitable for use in the formation of bags, and more particularly, to a films and bag structures that are suitable for use in bag in box packaging, as well as bag in box packaging having bags formed from such films.

2. Background Art

The use of bag in box packaging is ubiquitous. Typically, the bag within the bag in box packaging is formed form a multi-layer coextrusion, laminate or combination thereof. There are many performance considerations as to the construction of the bag components, namely, strength, ductility, product compatibility, among others. To achieve a good balance of features, many such bags comprise a combination of a number of different polymers, including, for example, combinations wherein certain layers are made from polyethylene, polypropylene and/or nylon. As such, while the structures have appropriate performance, they do suffer from drawbacks.

Among other drawbacks, it has been difficult to recycle such products, due to the combination of different polymers forming the generally inseparable layers. Problematically, it is difficult to achieve the desired and required performance while utilizing constructions that have as their base the same polymer to improve recyclability. For example, where films are formed based upon a single type of polymer, performance with respect to a performance parameter suffers so as to render the film unsuitable for bag in box purposes.

SUMMARY OF THE DISCLOSURE

The disclosure is directed a bag for use in a bag in box package. The bag comprises a front panel and a back panel coupled to the front panel through a plurality of seals, thereby defining a cavity structurally configured to retain a flowable material. Each of the front panel and the back panel comprise a film that has a first film portion and a second film portion laminated to the first film portion at an interface. The first film portion has an inner surface and an outer surface, the first film portion including an oriented polyethylene, wherein, among other configurations, the polyethylene may be oriented biaxially or in machine direction. The second film portion has a coextrusion having an inner surface and an outer surface. The extrusion comprises a core, with a first overlying layer on one side of the core and a second overlying layer on a second side of the core opposite the one side. The core includes EVOH and the first overlying layer and the second overlying layer include polyethylene.

In some configurations, the second portion is heat laminated to the first portion.

In some configurations, the second film portion comprises a five layer coextrusion. Specifically, the first overlying layer comprises a first outer side layer extending over the core on the one side and a second outer side layer extending over the first outer side layer. The second overlying layer has a first inner side layer extending over the core on the second side and a second inner side layer extending over the first inner side layer.

In some configurations, the first outer side layer and the first inner side layer each comprise a maleic anhydride modified linear low density polyethylene.

In some such configurations, the second outer side layer and the second inner side layer each comprise a linear low density polyethylene.

In some configurations, the core comprises between a 24 mol % and a 48 mol % ethylene EVOH. In some such configurations, the core comprises a 27 mol % ethylene EVOH.

In some configurations, the film has a film thickness, with the film thickness ranging between 25 μm and 130 μm. In some such configurations, the core has a core thickness, with the core thickness ranging between 2.5 μm and 13 μm.

In some such configurations, the first overlying layer and the second overlying layer each have an overlying layer thickness, with the overlying layer thickness ranging between 2.5 μm and 60 μm.

In some configurations, the first film portion and the second film portion has layers that consist entirely of polyethylene.

In some such configurations, the first film portion comprises a homogenous material.

In some configurations, the oriented polyethylene comprises on of a biaxially oriented polyethylene and a polyethylene oriented in the machine direction.

In some configurations, the bag further includes a front inner ply panel and a back inner ply panel, with the front inner ply panel abutting the back inner ply panel. The front panel extends over the front inner ply panel to define a front outer ply panel. The back panel extends over the back inner ply panel to define a back outer ply panel, with the panels each coupled together through seals, with the cavity further comprising an inner ply cavity.

In another aspect of the disclosure, the disclosure is directed to a film for a bag. The film comprises a front panel and a back panel coupled to the front panel through a plurality of seals, defining a cavity structurally configured to retain a flowable material. Each of the front panel and the back panel are made of a film that comprises a first film portion and a second film portion laminated to the first film portion at an interface. The first film portion has an inner surface and an outer surface. The first film portion includes an oriented polyethylene, wherein among other configurations, the polyethylene could either be oriented biaxially or in machine direction. The second film portion comprises a coextrusion having an inner surface and an outer surface. The extrusion comprises a core, with a first overlying layer on one side of the core and a second overlying layer on a second side of the core opposite the one side. The core includes EVOH. The first overlying layer and the second overlying layer include polyethylene.

In some configurations, the first film portion comprises a substantially homogenous material. The second film portion comprises a five layer coextrusion wherein the first overlying layer comprises a first outer side layer extending over the core on the one side and a second outer side layer extending over the first outer side layer, and, wherein the second overlying layer comprises a first inner side layer extending over the core on the second side and a second inner side layer extending over the first inner side layer.

In some configurations, the core comprises a 27 mol % ethylene EVOH. The first outer side layer and the first inner side layer comprise a maleic anhydride modified linear low density polyethylene. The second outer side layer and the second inner side layer each comprise a linear low density polyethylene.

In some configurations, the first film portion has a thickness of 23 µm and the second film portion has a thickness of 43 µm.

In some configurations, the first inner side layer and the first outer side layer each have a thickness of 4 µm, and the second inner side layer and the second outer side layer each have a thickness of 13 µm with the core having a thickness of 9 µm.

In another aspect of the disclosure, the disclosure is directed to a bag in box packaging. The bag in box packaging includes an outer rigid container and a bag positioned within the container. The outer rigid container has a plurality of walls defining a cavity. The bag has a configuration, among other variations, that is configured as described above.

In some configurations, the bag further includes a spout attached to the front panel, the spout placeable in fluid communication with the cavity of the bag.

BRIEF DESCRIPTION OF THE DRAWINGS

The disclosure will now be described with reference to the drawings wherein:

FIG. 1 of the drawings is a perspective view of a flexible bag of the present disclosure;

FIG. 2 of the drawings is a perspective view of a rigid outer container into which the flexible bag of the present disclosure can be placed;

FIG. 3 of the drawings is a cross-sectional view of a flexible bag of the present disclosure, showing, in particular, the structure of the spout and the flexible bag, taken generally about lines 3-3 of FIG. 1.

DETAILED DESCRIPTION OF THE DISCLOSURE

Figure 4:
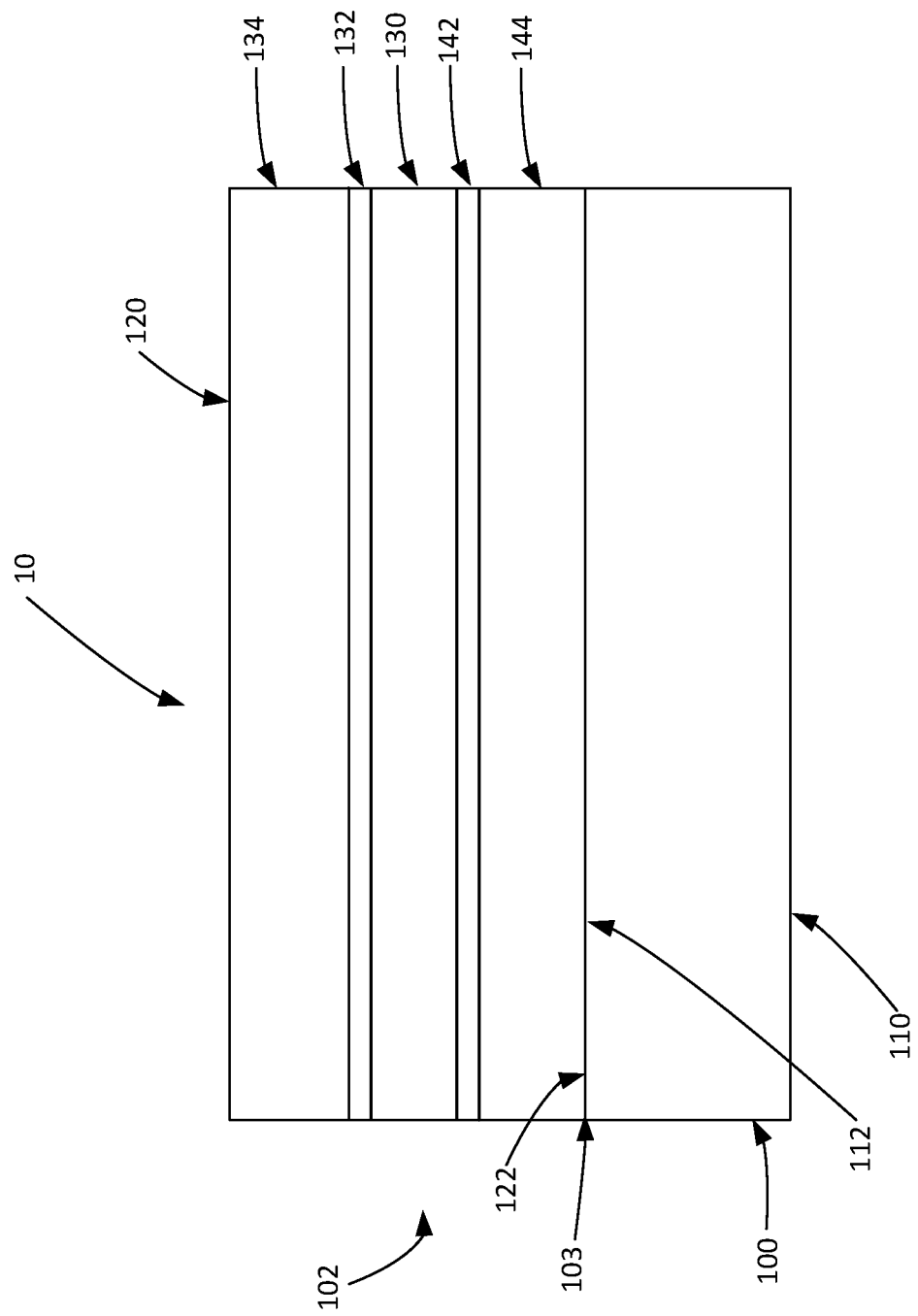
FIG. 4 of the drawings is a cross-sectional view of the layer structure of the film of the flexible bag.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1, 3 and 4, the film is shown generally at 10. The film comprises a multi-layer extrusion or laminate that can be formed into bags, such as bag 12. The bags can be used alone, or in combination with outer rigid containers, such as container 50. One such use is in association with bag-in-box packaging. In such applications, the bags may be used to store and dispense flowable material, including, but not limited to liquids, gels, syrups, such as soft drink syrup, beverages, such as wine, purees among other flowable material. It is contemplated that such a flowable material may comprise any number of different viscosities, and, may include a solids content. The foregoing examples of flowable material are meant to be illustrative, and not deemed to be limiting.

One illustrative bag of the type contemplated for use that can be formed in part or in whole from the film of the present disclosure is shown in FIGS. 1 and 3 as comprising a commonly known pillow type bag. Such a bag includes front panel 20 and back panel 22. Front panel 20 includes outer surface 30 and inner surface 32. The back panel 22 includes outer surface 34 and inner surface 36. The front and back panel are positioned in an overlying orientation so that the inner surfaces face each other.

The panels are then coupled together by way of seals 24. In the case of a pillow type container, the seals 24 include a top seal 31, bottom seal 33, first side seal 35 and second side seal 37. The seals are generally perpendicular to adjacent seals and parallel to opposing seals to generally define a square or rectangular configuration, thereby defining a generally square or rectangular cavity 29. The seals may be formed through the application of heat, or through other procedures, including, but not limited to RF welding, ultrasonic welding, adhesive, among others. The disclosure is not limited to any particular manner of attachment of the panels.

For many pillow type containers, an opening 26 is provided through the front panel 20 proximate, but, spaced apart from the bottom seal 33. A spout 40 can be coupled thereto in sealed engagement. In certain embodiments, multiple spouts may be provided, one, for example, for dispensing, and one for filling. In other embodiments, spouts may be positioned along the seals so as to extend between the panels. The film is configured for use in association with multiple configurations of spouts, as well as in embodiments that do not require spouts.

One type of spout is shown in FIG. 3 as comprising a base flange 42, and upstanding wall 44 extending from the base flange. The base flange includes top surface 41 and bottom surface 43 opposite top surface 41. Generally, the base flange is substantially planar and generally perpendicular to the upstanding wall 44. Either one of the top and bottom surfaces may be sealed to the front panel about opening 26, through a heat seal. Of course, other sealing methods, such as those identified above may be utilized in place of heat sealing.

The upstanding wall includes an outer surface 45 which includes grasping flanges, such as grasping flange 46 extending about the outer surface. Generally, these grasping flanges are disposed in a spaced apart orientation along the outer surface, generally parallel to the base flange 42. Of course, other configurations are likewise contemplated. The upstanding wall defines a passageway, which is generally of a circular configuration, terminating at opening 49 spaced distally from the base flange 42. Of course, other cross-sectional configurations are contemplated, and the disclosure is not limited to any particular configuration of the spout.

It will be understood that such a bag may be positioned within an rigid outer carton, such as an outer carton 50 which is shown in FIG. 2. The outer box includes a bottom wall 51, top wall 52, first side wall 54, second side wall 56, front wall 57 and back wall 58. The outer box that is shown in the figures comprises a rectangular cubic configuration. Of course, such a configuration is merely exemplary, and not to be deemed limiting. It will be understood that other containers, such as those having fewer or greater number of sides (i.e., a hexagonal or octagonal box having a plurality of sides along with a bottom and top wall are contemplated as well). In some embodiments, one of the walls, and in the embodiment shown, the front wall 57, may include an opening 53 which provides access to the cavity 59, and the bag therein. In other embodiments, it may be necessary to remove one of the walls to gain access to cavity 59. It is contemplated that the outer carton comprises a paperboard material, such as a corrugated paperboard. Of course, other materials are likewise contemplated for use, including, but not limited to, other paperboard materials, polymer materials, including bio-polymers, and the like.

It will be understood that any number of different members may be coupled to the spout described above. For example, a cap or a dispensing fitment may be coupled to the above configuration. Such connectors may include those disclosed in U.S. Pat. No. 7,387,277 issued to Verespej et al, U.S. Pat. No. 7,469,522 issued to Verespej et al, U.S. Pat. No. 7,114,625 issued to Jones, et al, U.S. Pat. No. 8,448,799 issued to Thurman, as well as various Quick connect, disconnect fittings (QCD) that are utilized in association with soft drink syrups among other. It is also contemplated that dispensers such as those disclosed in U.S. Pat. Nos. 4,619,377 and 6,978,981 both of which are issued to Roos as well as U.S. Pat. Nos. 6,045,119; 6,296,157 and 6,360,925 issued to Erb, U.S. Pat. No. 8,336,743 issued to Bellmore, U.S. Pat. No. 7,240,811 issued to Roser. Additionally, it will be understood that the spout or the cavity may further include different structures to aid in the dispensing of flowable material. Among such structures, it is contemplated that the structures coupled to the spout, including but not limited to those shown in U.S. Pat. No. 5,749,493 issued to Boone et al; U.S. Pat. No. 5,941,421 issued to Overman et al and U.S. Pat. No. 6,102,252 issued to Overman et al and U.S. Pat. No. 4,138,036 issued to Bond are contemplated for use. Each of the foregoing references are incorporated by reference in their entirety.

It will be understood that while a pillow type bag is shown, the film is not limited to use therewith. For example, the bay may comprise a gusseted bag wherein four panels are coupled together to form a generally rectangular shaped bag. One such configuration is shown in U.S. Pat. No. 5,788,121 issued to Sasaki et al. Another such configuration is shown in U.S. Pat. No. 6,783,277 issued to Edwards. The foregoing patents are incorporated by reference in their entirety.

It will further be understood that a single ply pillow type bag is shown in FIG. 1 (with optional dashes shown in FIG. 3 for an additional inner ply 201, 203), while other configurations are contemplated. For example, a multi-ply bag, pillow, or otherwise, is likewise contemplated for use. For example, such a container may include multiple plies, sharing common seals, or having separate individual seals. It will be understood that each ply may comprise a different wall construction, and it is contemplated that the multiple plies may comprise co-extrusions, laminates or a combination of the structures. For example, as set forth below, a two-ply configuration was utilized for testing purposes, with the outer ply comprising the film of the present disclosure.

With reference to FIG. 4, film 10 is shown as comprising first film portion 100 and second film portion 102 which are laminated to each other at interface 103. In the configuration shown, the first film portion and the second film portion are thermally laminated to each other (while adhesive lamination is likewise contemplated). Advantageously, the first and second film structures comprise an all polyethylene structure which vastly improves recyclability, while providing the necessary structural features. While a number of different thicknesses are contemplated for the overall film 10, it is contemplated that the film has a thickness of, preferably, between 43 µm and 142 µm The first film portion 100 comprises an outer side 110 and an inner side 112. As will be understood, the inner side 112 is at the interface 103. In the configuration shown, the first film portion 100 comprises an oriented polyethylene, such as, for example a biaxially oriented polyethylene (BOPE). In one configuration, the first film portion comprises a product designated as 23XE400 available from Jindal Films of LaGrange, Georgia The first film portion in such a configuration has a thickness of 23 µm. A number of different films also available from Jindal Films under the product designations 18XE400, 30XE400, 40XE400 as well as films available from Guangdong Decro Film New Materials CO., LTD. and sold under the product designations Decro DL, which is available in thicknesses ranging from 25 µm to 50 µm. Preferably, the thickness of the first film portion is between 18 µm and 40 µm.

It is contemplated that the first film portion comprises a single substantially homogenous material. In other configurations, the first film portion may be formed from a plurality of different layers of polyethylene that may be coextruded or laminated to each other. Preferably, the first film portion comprises a polyethylene material for purposes of recyclability. In some configurations, the first portion may comprise an oriented polyethylene material that is oriented in the machine direction instead of being biaxially oriented.

The second film portion 102 comprises a five layer polyethylene extrusion which collectively defines an outer surface 120 and an inner surface 122. The inner surface 122 mates with the inner surface 112 of the first film portion at interface 103 (which is the thermal lamination interface). In the configuration shown, the second film portion includes a core 130 with an outer side and an inner side. The outer side comprises a first outer side layer 132 and a second outer side layer 134. The inner side comprises a first inner side layer 142 and a second inner side layer 144.

The core comprises an ethylene vinyl alcohol (EVOH) material, and in the particular configuration shown, 27 mol % ethylene EVOH having a thickness of 9 µm. A number of different compositions of EVOH are contemplated ranging from 24 mol % ethylene EVOH to 48 mol % ethylene EVOH. Additionally, a range of thicknesses are contemplated, ranging from 2.5 µm to 13 µm.

The second outer side layer 134 and the second inner side layer 144 each comprise a linear low density polyethylene (LLDPE). In the configuration shown, the LLDPE layer has a thickness of 13 µm. Various thicknesses are contemplated, varying between, for example, 4 µm and 60 µm. Additionally, while both the second outer side layer 134 and the second inner side layer are shown as being substantially identical in thickness, it is contemplated that the two layers can be of different thicknesses and that they may not match each other. Furthermore, the two layers may have different densities and formulations.

The first outer side layer 132 and the first inner side layer 142 each comprise a maleic anhydride modified linear low density polyethylene (LLDPE). In the configuration shown, the layer has a thickness of 4 μm. Various thicknesses are contemplated, varying between, for example, 2.5 μm and 8 μm. Additionally, while both the first outer side layer and the second outer side layer are shown as being substantially identical in thickness, it is contemplated that the two layers may have different thicknesses and that they do not match each other. Additionally, the two layers may be of materials having different densities and formulations.

It is further contemplated that the second film portion may comprise an EVOH core which has a polyethylene layer on either side of the EVOH core, wherein the polyethylene layer may comprise a plurality of separate layers, as disclosed above, including two or more separate layers, or may comprise a single layer of a relatively homogeneous material that would be defined as a single layer. Additionally, it is contemplated that multiple EVOH layers may comprise the core, wherein the EVOH layers may be separated by polyethylene layers, for example. That is, for example, a seven layer extrusion may be formed that includes a core having multiple EVOH layers and a single polyethylene layer. Alternatively, the EVOH core may comprise a plurality of separate EVOH layers that are extruded in a side by side configuration. In still other configurations, the EVOH layers may be separated by other layers having polyethylene. In such a configuration, an overlying layer is formed on either side of the core, that is, a first overlying layer that, in the configuration shown, includes a first and second outer layer, and, a second overlying layer that, in the configuration shown, includes a first and second inner layer.

Sample film was formed having the following construction wherein the first film portion was formed from a 23 μm LLDPE; the second film portion was formed from a core of 9 μm 27 mol % ethylene EVOH with the first inner and outer side layers comprising a 4 μm maleic anhydride modified with the second inner and outer side layers comprising a 13 μm LLDPE. The first film portion and the second film portion were joined together through a heat lamination utilizing commercially available lamination equipment at 210° F. operating at 650 feet/minute without a corona treatment. It was observed that the second film portion could not be peeled apart from the first film portion.

The film was tested to determine the different properties thereof. In particular, testing was utilized, following various ASTM test methods of the Coefficient of Friction (COF), the oxygen transmission rate (OTR), the puncture resistance and the Gelbo Flex testing. The results of the above film structure was compared to a number of different structures. In particular, the structure of the present invention was compared to other film structures which are disclosed below. The configuration of the present disclosure is identified as 2L-4 in the tables below.

TABLE 1

Film Samples

| Sample | Type | Description (Outside/Inside) |
| --- | --- | --- |
| 3L | 3-Layer Laminate | 43 μm EVOH co-ex//10 μm BON//36 μm PE co-ex |
| CF | Coextruded Film | 20 μm PE/5 μm tie/8 μm EVOH/5 μm tie/35 μm PE |
| 2L-1 | 2-Layer Laminate | 10 μm BON//43 μm EVOH co-ex |
| 2L-2 | 2-Layer Laminate | 19 μm BOPP//43 μm EVOH co-ex |
| 2L-3 | 2-Layer Laminate | 23 μm BOPE//43 μm EVOH co-ex |
| 2L-4 | 2-Layer Laminate | 43 μm EVOH co-ex//23 μm BOPE |

TABLE 2

Film Properties

| | ASTM Test Method | 3L | CF | 2L-1 | 2L-2 | 2L-3 | 2L-4 |
| --- | --- | --- | --- | --- | --- | --- | --- |
| COF | D-1894 | 0.15 | 0.13 | 0.32 | 0.24 | 0.48 | 0.15 |
| OTR cc/100 in$^2$/day@100% O$_2$ 50% RH outside and 90% RH inside | F-1927 | 0.02 | 0.03 | 0.02 | 0.08 | 0.07 | 0.02 |
| Puncture Resistance gf | D-3420 | 1660 | 590 | 1150 | 1340 | 1230 | 1000 |
| CD/MD Gelbo Flex Test holes/2,000 cycles | F-392 | 5/4 | 7/10 | 25/34 | 3/n/a | 1/n/a | <1/<1 |

Based upon these test results, it was determined that overall, the configuration of the present disclosure provided suitable results in light of the different constructions with respect to the different parameters.

The sample film was formed into five liter bags, with the BOPE forming the inner side of the bag. With the formed bags, the film of the present disclosure was utilized as the outer ply in a two ply bag, with the inner ply being formed from an extruded polyethylene film 38 μm thick.

Additionally, bags utilizing the 3L sample above were also made, wherein the 3L film was utilized form the outer ply and the same inner ply as the first bag was utilized. These bags were tested in two different ways. Specifically, the bags were tested using a drop test and a transportation simulation test (shaker table test). For the drop test, the same bag is dropped three times from 30-inches, and then until failure or 25 drops is achieved. For the shaker table test, the package is vibrated at 210 revolutions per minute, and evaluated for leakers every half an hour for 90 minutes. The shaker table test is a very severe test and is used for comparative purposes only. The results of the tests are set forth below in Table 3.

TABLE 3

| Bag Properties | | |
|---|---|---|
| | 3L Outer Ply PE Inner Ply | 2L-4 Outer Ply PE Inner Ply |
| Drop-30" height | 0 fail < 3 drops | 0 fail < 3 drops |
| Shaker Table Test (% Leakers) | 23 | 15 |

The film of the present disclosure exhibits comparable performance to the film 3L in a test that is extremely aggressive, and well in excess of real world transportation conditions. Therefore, the performance of the bag having the film of the present disclosure appears to be suitable for liquid packaging in a bag in box format.

Advantageously, especially when compared to the 3L film, the film of the present disclosure is a structure wherein each layer comprises a polyethylene composition. Whereas the 3L film includes biaxially oriented nylon, combined with polyethylene structures, the film of the present disclosure comprises a single material, namely polyethylene, as the basis for each layer, which renders the film substantially more suitable for recycling purposes. That is, the product carries a single PE symbol for recycling, providing great improvement over the prior art (especially the 3L film) while providing performance suitable for use in association with the packaging of liquid (i.e., flowable material) in a bag in box packaging.

Furthermore, with the use of the biaxially oriented polyethylene as the first film portion, processing in converting equipment and bag forming equipment is improved due to low elongation values in both the machine direction and also the transverse direction.

While it is contemplated that the first film portion is on the product contact side (or the inner side of the bag), generally to improve the oxygen transmission rate, and to preserve the core layer of the second film portion. In configurations wherein the oxygen transmission rate is not critical, significant and/or important, the bag can be formed with the first film portion on the outer side with the second film portion on the inside of the bag and forming the product contact surface.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A bag for use in a bag in box package comprising:
a front panel and a back panel coupled to the front panel through a plurality of seals, thereby defining a cavity structurally configured to retain a flowable material, each of the front panel and the back panel comprising a film, the film comprising a first film portion and a second film portion laminated to the first film portion at an interface, wherein:

the first film portion having an inner surface and an outer surface, the first film portion comprising an oriented polyethylene; and the second film portion comprising a five layer coextrusion having an inner surface and an outer surface, defining from the outer surface to the inner surface five layers, sequentially comprising, a second outer side layer, a first outer side layer, a core, a first inner side layer and a second inner side layer, the core comprising a single EVOH having between 24 mol % and 48 mol % ethylene, the second inner and outer side layers comprising a linear low density polyethylene, the first inner and outer side layers comprising a maleic anhydride modified linear low density polyethylene, where one of the second outer side layer or the second inner side layer is laminated to the first film portion at the interface, wherein the film including the first film portion and the second film portion comprise a single material, namely polyethylene, as the basis for each film layer such that the film is compatible for polyethylene recycling purposes and branding as PE recyclable with a single PE symbol.

2. The bag of claim 1 wherein the second portion is heat laminated to the first portion.

3. The bag of claim 1 wherein the single EVOH has 27 mol % ethylene.

4. The bag of claim 1 wherein the film has a film thickness, with the film thickness ranging between 43 μm and 180 μm.

5. The bag of claim 4 wherein the core has a core thickness, with the core thickness ranging between 2.5 μm and 13 μm.

6. The bag of claim 5 wherein the second outer side layer and the first outer side layer define an outer side layer thickness, with the outer side layer thickness ranging between 2.5 μm and 60 μm.

7. The bag of claim 1 wherein the first film portion comprises a homogenous material.

8. The bag of claim 1 wherein the oriented polyethylene comprises one of a biaxially oriented polyethylene and a polyethylene oriented in the machine direction.

9. The bag of claim 1 further comprising a front inner ply panel and a back inner ply panel, with the front inner ply panel abutting the back inner ply panel, with the front panel extending over the front inner ply panel to define a front outer ply panel and with the back panel extending over the back inner ply panel to define a back outer ply panel, with the panels each coupled together through seals, with the cavity further comprising an inner ply cavity.

10. A bag in box package comprising:
an outer rigid container having a plurality of walls defining a cavity;
a bag of claim 1 positioned within the cavity of the outer rigid container.

11. The bag in box package of claim 10 wherein the bag further includes a spout attached to the front panel, the spout placeable in fluid communication with the cavity of the bag.

* * * * *